(12) United States Patent
Tang et al.

(10) Patent No.: US 9,379,599 B2
(45) Date of Patent: Jun. 28, 2016

(54) TUBULAR LINEAR MOTOR

(71) Applicant: SANYO DENKI CO., LTD., Tokyo (JP)

(72) Inventors: Yuqi Tang, Tokyo (JP); Yasushi Misawa, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 611 days.

(21) Appl. No.: 13/851,678

(22) Filed: Mar. 27, 2013

(65) Prior Publication Data

US 2013/0257180 A1 Oct. 3, 2013

(30) Foreign Application Priority Data

Mar. 29, 2012 (JP) .................................. 2012-078034

(51) Int. Cl.
*H02K 41/03* (2006.01)
*H02K 21/24* (2006.01)
*H02K 1/27* (2006.01)

(52) U.S. Cl.
CPC ............ *H02K 41/031* (2013.01); *H02K 1/2713* (2013.01); *H02K 21/24* (2013.01)

(58) Field of Classification Search
CPC ..... H02K 1/2713; H02K 21/24; H02K 41/03; H02K 41/031
USPC .......................... 310/12.18, 12.24, 15, 156.43
IPC ........................................................ H02K 41/03
See application file for complete search history.

(56) References Cited

U.S. PATENT DOCUMENTS

| | | | | |
|---|---|---|---|---|
| 4,451,502 A | * | 5/1984 | Takada | G11B 5/845 427/128 |
| 5,214,279 A | * | 5/1993 | Hakamata | G02B 21/002 250/234 |
| 5,440,183 A | * | 8/1995 | Denne | F15B 15/00 310/12.26 |
| 6,040,642 A | | 3/2000 | Ishiyama | |
| 7,687,942 B2 | * | 3/2010 | Jenny | H02K 41/031 310/12.01 |
| 7,888,827 B2 | * | 2/2011 | Kaneshige | H02K 41/03 310/12.21 |
| 7,928,612 B2 | * | 4/2011 | Chung | H02K 1/148 310/12.24 |
| 8,044,541 B2 | * | 10/2011 | Toyota | G03F 7/70716 310/12.01 |
| 8,102,085 B2 | * | 1/2012 | Jajtic | H02K 41/031 310/12.01 |

(Continued)

FOREIGN PATENT DOCUMENTS

| CN | 101779370 A | 7/2010 |
|---|---|---|
| CN | 102187556 A | 9/2011 |

(Continued)

OTHER PUBLICATIONS

JP OA in foreign counterpart application JP2012-078034 dated Dec. 1, 2015.

(Continued)

*Primary Examiner* — John K Kim
(74) *Attorney, Agent, or Firm* — Polsinelli PC

(57) ABSTRACT

The tubular linear motor includes an armature having a coil and a magnetic exciter having a permanent magnet provided to face the coil. The armature has a yoke that blocks a magnetic flux, teeth that partition a slot for storing the coil, and the coil that is arranged to extend over the teeth from an inner side of the slot toward the magnetic exciter while a mechanical gap is reserved between the magnetic exciter and the coil. The magnetic exciter has a plurality of permanent magnets by interposing a soft magnetic body.

14 Claims, 11 Drawing Sheets

(56) References Cited

U.S. PATENT DOCUMENTS

| | | | | |
|---|---|---|---|---|
| 8,102,090 B2* | 1/2012 | Takeuchi | ............ | H02K 1/2713 310/156.32 |
| 2003/0230940 A1* | 12/2003 | Miyashita | ............... | H02K 41/03 310/12.24 |
| 2004/0251751 A1* | 12/2004 | Wavre | .................... | H02K 1/20 310/52 |
| 2005/0151428 A1* | 7/2005 | Miyashita | ............... | H02K 41/03 310/12.26 |
| 2008/0111430 A1 | 5/2008 | Jenny | | |
| 2008/0211324 A1* | 9/2008 | Jack | .................... | H02K 1/145 310/12.24 |
| 2009/0127939 A1 | 5/2009 | Kaneshige et al. | | |
| 2010/0201210 A1 | 8/2010 | Nakayama et al. | | |
| 2011/0062901 A1* | 3/2011 | Busch | ................. | H02K 41/031 318/135 |
| 2011/0193425 A1* | 8/2011 | Hiura | .................. | H02K 41/031 310/12.01 |
| 2013/0082545 A1* | 4/2013 | Goto | .................... | H02K 41/02 310/12.24 |
| 2013/0257180 A1* | 10/2013 | Tang | .................... | H02K 41/031 310/12.18 |
| 2015/0022049 A1* | 1/2015 | Fujii | ....................... | H02K 1/02 310/211 |
| 2015/0116865 A1* | 4/2015 | Mizuno | ................... | G11B 17/02 360/99.08 |
| 2015/0173871 A1* | 6/2015 | Kyotani | ............... | A61C 13/235 433/189 |

FOREIGN PATENT DOCUMENTS

| | | |
|---|---|---|
| JP | 10-313566 A | 11/1998 |
| JP | 2007-221960 A | 8/2007 |
| JP | 2008-125345 A | 5/2008 |
| JP | 2008-206335 A | 9/2008 |
| JP | 2012-100407 A | 5/2012 |
| WO | WO-2007040009 A1 | 4/2007 |
| WO | WO-2009/044748 A1 | 4/2009 |
| WO | WO-2011/155022 A1 | 12/2011 |

OTHER PUBLICATIONS

Chinese Office Action issued on Apr. 27, 2016 for the corresponding Chinese Patent Application No. 201310109046.2.

* cited by examiner

FIG. 2 ( A )
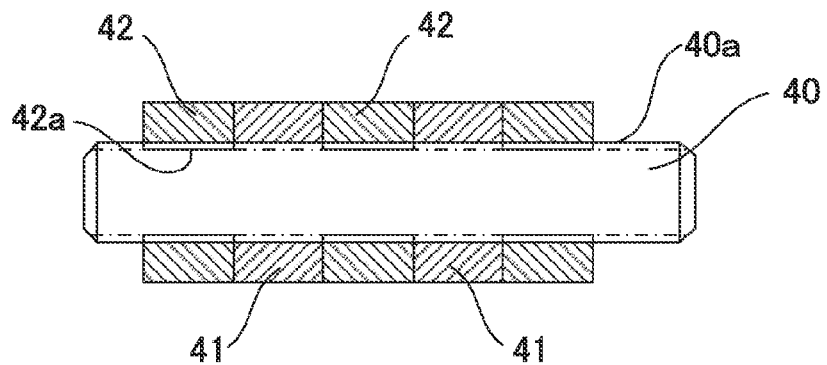
FIG. 2 ( B )
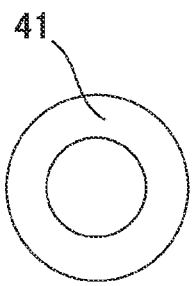 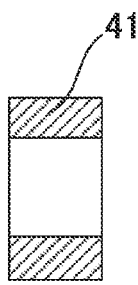
FIG. 2 ( C )
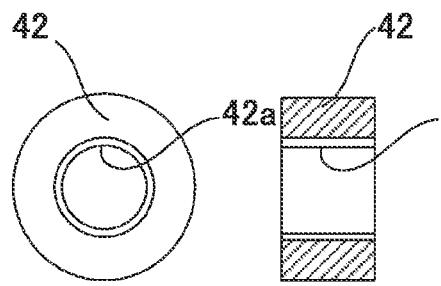

FIG. 9 ( A )
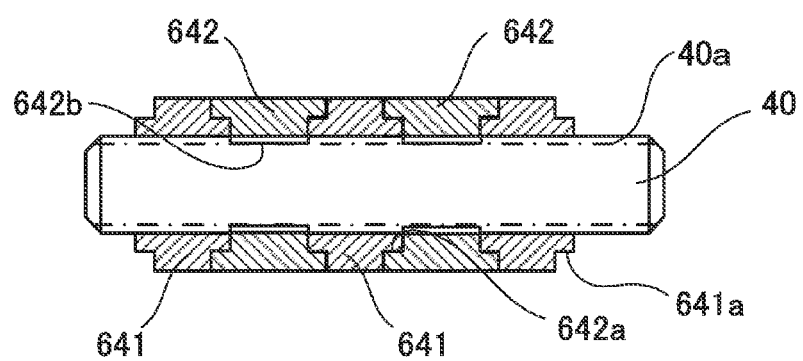
FIG. 9 ( B )   FIG. 9 ( C )
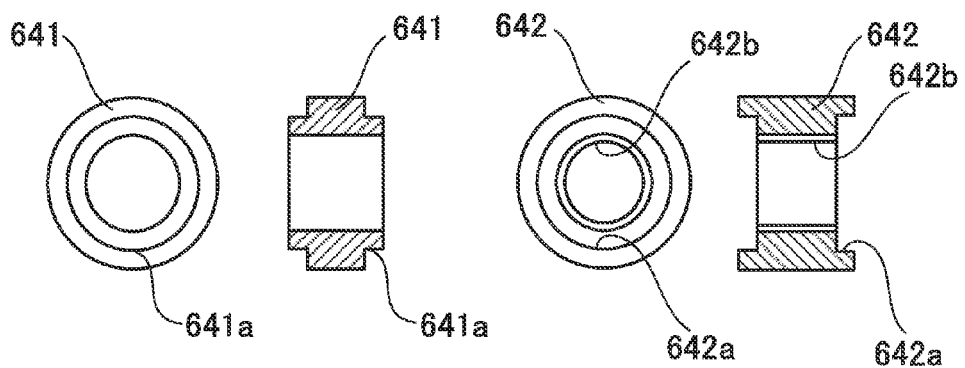

FIG. 10 ( A )
702
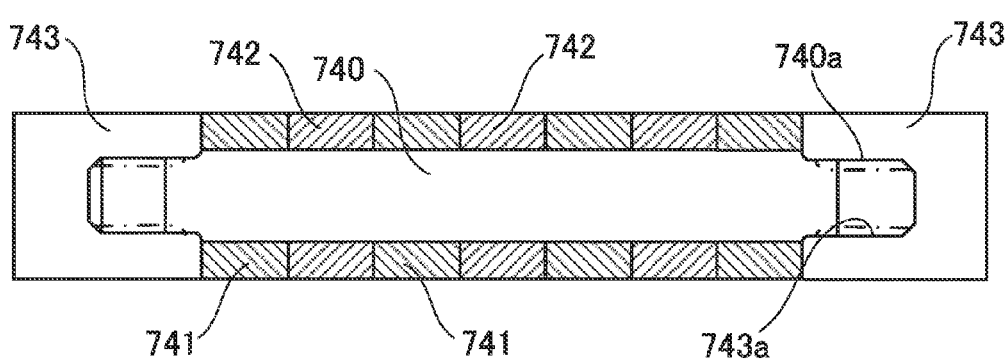
FIG. 10 ( B )         FIG. 10 ( C )
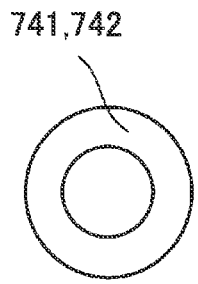 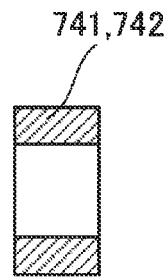    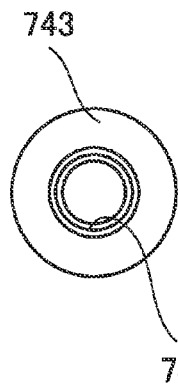 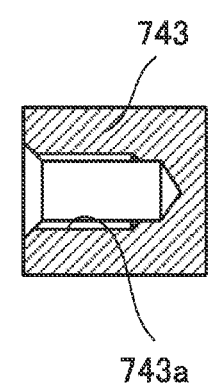

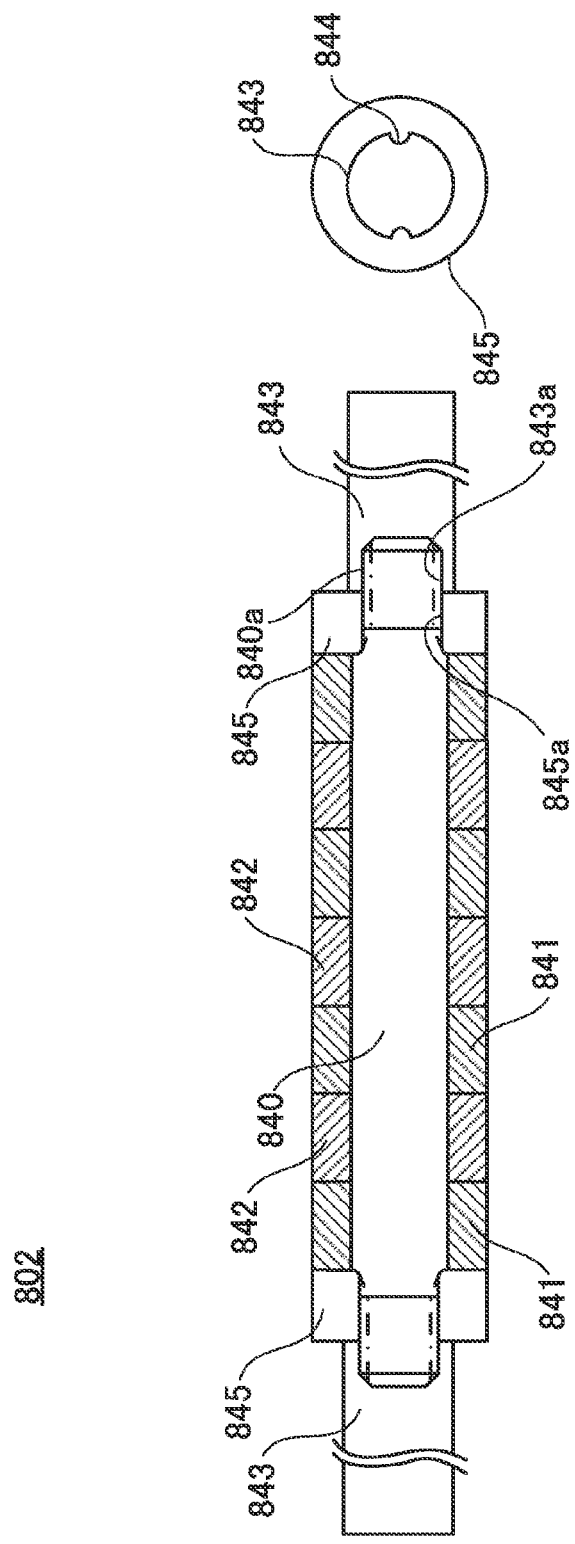

TUBULAR LINEAR MOTOR

CROSS-REFERENCE TO RELATED APPLICATION

This application claims priority to Japanese Application No. 2012-078034, filed Mar. 29, 2012, the entirety of which is incorporated herein by reference.

BACKGROUND

1. Technical Field

The present invention relates to a tubular linear motor that exerts a rectilinear motion to a driving target based on an electromagnetic force.

2. Description of Related Arts

In general, a tubular linear motor includes a magnetic exciter in which a plurality of permanent magnets is arranged in series such that different magnetic poles face each other, and an armature having a coil, arranged to surround the magnetic exciter and slidable along an axial direction of the magnetic exciter.

In the tubular linear motor, an electric current flows through the coil of the armature to intersect a magnetic flux generated by the permanent magnet of the magnetic exciter, so that a driving force in an axial direction is generated in the coil based on the electromagnetic induction effect to move the armature.

As a technique relating to the armature of the linear motor, there are disclosed a linear synchronous motor and a linear actuator, in which a thrust force ripple and a cogging force are reduced by setting a magnetic gap (distance from a tooth leading edge to the magnet surface) of the teeth positioned in both ends of an axial direction to be narrow and regularizing a magnetic flux density between a plurality of teeth (for example, refer to WO 2007/040009 A).

As a technique relating to the magnetic exciter of the linear motor, there is disclosed a linear motor in which a stator unit is configured such that a center shaft made of a nonmagnetic material is inserted into the permanent magnets having a tubular shape, and the neighboring permanent magnets closely abut on each other by strongly clamping the permanent magnets from both ends (for example, refer to JP 10-313566 A).

However, in the technique disclosed in WO 2007/040009 A, a magnetic flux distribution is different between both end teeth of an axial direction and a center tooth, so that an edge effect is enhanced due to the narrow magnetic gap. Therefore, if a core deviation (eccentric core) is generated in the center shaft, a thrust force ripple and a cogging force unfortunately increase due to influence of the magnetic attractive force.

In the technique disclosed in JP 10-313566 A, the neighboring permanent magnets closely abut on each other. Therefore, the magnetic flux can reach farther, whereas an average magnetic flux is low, and there is a limitation to increase the thrust force.

In addition, since the magnets are arranged to repulsively interact with each other, it is difficult to manufacture the magnetic exciter by overcoming the strong magnetic repulsive force.

Furthermore, the permanent magnets are arranged to closely abut on each other around the center shaft, and the soft magnetic body is not provided between the permanent magnets. Therefore, consumption of the permanent magnetic material is large, and the manufacturing cost of the linear motor increases.

SUMMARY

The present invention has been made in view of the aforementioned problems and provides a tubular linear motor capable of reducing influence of the magnetic attractive force caused by a core deviation and consumption of the permanent magnetic material and increasing an average magnetic flux density and an effective utilization rate of the permanent magnet contributing to the thrust force so as to achieve both high performance and low cost.

According to an aspect of the invention, there is provided a tubular linear motor including an armature having a coil and a magnetic exciter that is provided to face the coil and has a permanent magnet.

The armature may have a yoke, teeth, and a coil. The yoke may close a magnetic flux. The teeth may partition a slot for storing the coil. The coil may be arranged to extend over the teeth from an inner side of the slot toward the magnetic exciter while a mechanical gap is reserved.

The magnetic exciter may have a plurality of permanent magnets by interposing a soft magnetic body.

In the tubular linear motor according to the present invention, the coil extends over the teeth from the inner side of the slot toward the magnetic exciter, so that the coil is arranged in both the inner and outer sides of the slot. Therefore, it is possible to increase the winding number of the coil and the thrust force of the rectilinear motion.

Since the coil extends over the teeth from the inner side of the slot toward the magnetic exciter while a mechanical gap is reserved, the diametrical length of the tooth is smaller than the diametrical length of the coil. Therefore, the magnetic gap is widened, and the influence of magnetic attractive force caused by a core deviation is reduced.

The magnetic exciter has a plurality of permanent magnets by interposing the soft magnetic body. Therefore, it is possible to reduce consumption of the permanent magnetic material and increase an average magnetic flux density and an effective utilization rate of the permanent magnet contributing to the thrust force, so that the manufacturing cost of the tubular linear motor can be reduced.

BRIEF DESCRIPTION OF THE DRAWINGS

FIGS. 2A to 2C are schematic cross-sectional views and front views illustrating an assembly structure of a magnetic exciter in the tubular linear motor according to Embodiment 1;

FIGS. 9A to 9C are schematic cross-sectional views and front view illustrating a magnetic exciter in a tubular linear motor according to Embodiment 6;

FIGS. 10A to 10C are schematic cross-sectional views and front view illustrating a magnetic exciter in a tubular linear motor according to Embodiment 7; and FIGS. 11A and 11B are a schematic cross-sectional view and a front view, respectively, illustrating a magnetic exciter in a tubular linear motor according to Embodiment 8.

DETAILED DESCRIPTION

Hereinafter, tubular linear motors according to Embodiments 1 to 8 will be described with reference to the accompanying drawings.

In the tubular linear motors according to Embodiments 1 to 8, a coil is arranged in both inner and outer sides of a slot. Therefore, the winding number of the coil increases. Since the coil extends over teeth from the inner side of the slot toward a magnetic exciter, a magnetic gap is widened. The magnetic exciter has a plurality of permanent magnets by interposing a soft magnetic body. Therefore, according to Embodiments 1 to 8, it is possible to provide a tubular linear motor capable of reducing influence of a magnetic attractive force caused by a core deviation and consumption of a permanent magnetic material and increasing an average magnetic flux density and an effective utilization rate of the permanent magnet contributing to a thrust force with low cost.

Embodiment 1

[Configuration of Tubular Linear Motor]

Figure 1:
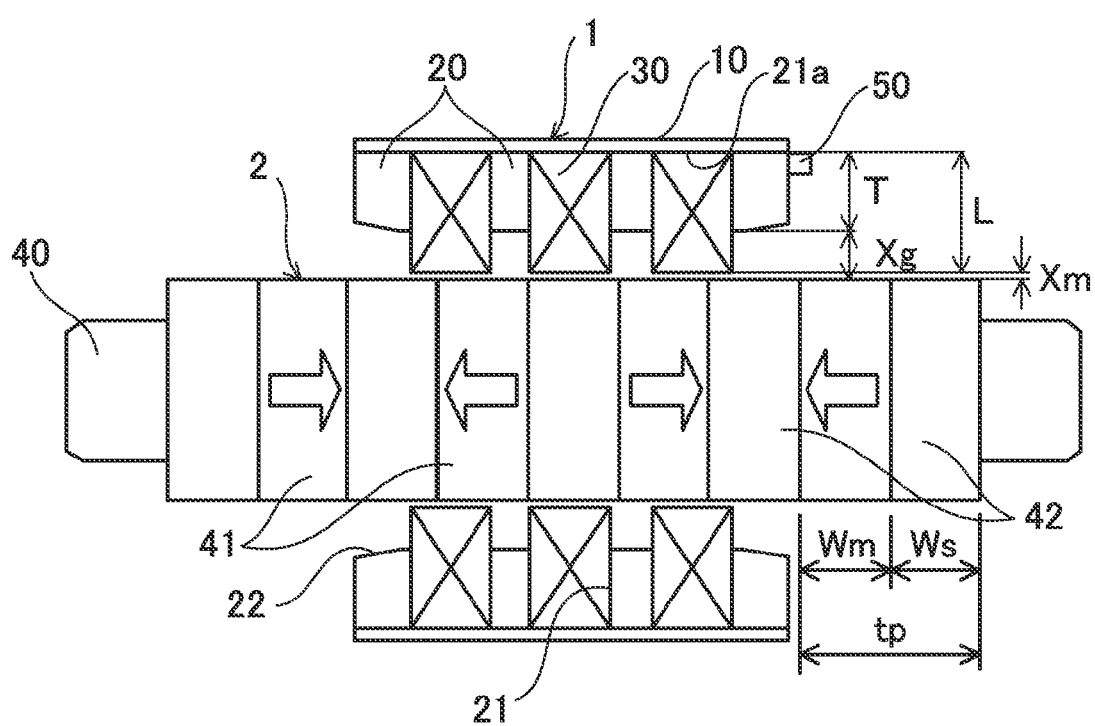
FIG. 1 is a schematic cross-sectional view illustrating a tubular linear motor according to Embodiment 1.

First, a configuration of a tubular linear motor according to Embodiment 1 will be described with reference to FIGS. 1 and 2A to 2C. FIG. 1 is a schematic cross-sectional view illustrating a tubular linear motor according to Embodiment 1.

As illustrated in FIG. 1, the tubular linear motor 100 according to Embodiment 1 includes an armature 1 and a magnetic exciter 2.

The armature 1 has a yoke 10, teeth 20, and a coil 30. According to Embodiment 1, the armature 1 serves as a mover.

The yoke 10 is a tubular magnetic metal member having a cylindrical shape and the like. The yoke 10 closes magnetic field lines from the magnetic exciter 2 to maximize an electromagnetic induction effect of the permanent magnet 41 described below. The yoke 10 also prevents peripherals of the tubular linear motor 100 from being affected by the magnetic field caused by the electromagnetic induction.

The yoke 10 may be made of, for example, but not limited to, an iron-based magnetic material such as an SC material.

The teeth 20 are a member that partitions a slot 21 as a space for storing the coil 30. The teeth 20 according to the present embodiment are formed in a generally ring-like shape along an inner surface of the yoke 10. A plurality of teeth 20 are installed side by side in the inner circumferential surface of the yoke 10 along an axial direction.

Between the teeth 20 and 20, a plurality of slots 21 having a ring-like concave shape is formed side by side along an axial direction. In each slot 21, the outer side of a diametrical direction is closed by the yoke 10, and the inner side of a diametrical direction is opened. The number of slots 21 corresponds to the number of coils 30. According to the present embodiment, three slots 21 are formed, and three coils 30 are arranged and stored side by side along an axial direction. However, the number of slots 21 and the number of coils 30 are not particularly limited.

The diametrical length T of the tooth 20 is set to be smaller than the diametrical length L of the coil 30. Specifically, the tooth diametrical length T is set to 0.6 times or smaller of the coil diametrical length L (diametrical length L obtained by subtracting a mechanical gap Xm from a distance between the closed end 21a of the slot 21 and the magnetic surface of the magnetic exciter 2). The reason why the diametrical length T of the tooth 20 is set to $T \leq L \times 0.6$ will be described below.

The teeth 20 may be made of, for example, the same material as that of the yoke 10. However, the teeth 20 are preferably made of a silicon steel plate in order to achieve both performance and cost. Since the tooth 20 is a magnetic body, a gap between the tooth surface and a magnetic surface of the magnetic exciter 2 corresponds to a magnetic gap Xg.

A taper portion 22 for alleviating cogging (vibration caused by a magnetic flux variation between the magnetic exciter 2 and the tooth 20) during the rectilinear motion is formed in the teeth 20 of both ends of the axial direction. In order to form the taper portion 22 in the teeth 20 of both ends of the axial direction, the teeth 20 of both ends of the axial direction are preferably formed by cutting an easy fabrication material such as a S50C block material.

The coil 30 is wound around the inner circumferential surface of the yoke 10 in a cylindrical shape. The coil 30 according to the present embodiment is arranged to extend over the teeth 20 from the inner side of the slot 21 toward the magnetic exciter 2 while a mechanical gap is reserved. That is, a part of the coil 30 is stored in the slot 21, and the remaining part is arranged to extend to the outer side of the slot 21. Since the coil 30 is arranged in the outer side of the slot 21, the winding number of the coil 30 increases, so that it is possible to increase a thrust force of the rectilinear motion caused by the electromagnetic induction.

Here, the mechanical gap Xm refers to a mechanical distance between the coil 30 and the magnetic exciter 2. According to the present embodiment, the magnetic gap Xg (distance from the leading end of the tooth to the magnetic surface of the magnetic exciter 2) is set to be larger than the mechanical gap Xm.

As described above, according to the present embodiment, three coils 30 are provided side by side along an axial direction. However, the number of coils 30 is not particularly limited.

The magnetic exciter 2 includes a shaft 40, a permanent magnet 41, and a soft magnetic body 42. According to Embodiment 1, the magnetic exciter 2 serves as a stator.

The magnetic exciter 2 is arranged to face the coil 30. The magnetic exciter 2 according to the present embodiment is provided inside the cylindrical coil 30 along an axial direction to face the coil 30.

The magnetic exciter 2 has permanent magnets 41 magnetized to repulsively interact with each other (N-N or S-S) along an axial direction around the shaft 40 of the nonmagnetic material. The soft magnetic body 42 is interposed between the permanent magnets 41 and 41 arranged to repulsively interact with each other.

It is preferable that a relationship tp=Wm+Ws be established, where tp denotes a magnetic pole pitch of the magnetic exciter 2, Wm denotes a width of the permanent magnet 41, and Ws denotes a width of the soft magnetic body 42, and the width Wm be set to $0.8 \pm 0.1$ tp. If the soft magnetic body 42 is interposed between the permanent magnets 41 and 41 arranged to repulsively interact with each other with a size of approximately 20 to 30% of the magnetic pole pitch tp, it is possible to reduce consumption of the permanent magnetic material and increase an average magnetic flux density of the magnetic exciter 2.

Next, a detailed configuration of the magnetic exciter 2 will be described with reference to FIGS. 2A to 2C. FIGS. 2A to 2C are schematic cross-sectional views and front views illustrating an assembly of the magnetic exciter in the tubular linear motor according to Embodiment 1.

As illustrated in FIG. 2A, in the magnetic exciter 2, the permanent magnets 41 and the soft magnetic bodies are alternately arranged around the shaft 40. Specifically, the cylindrical permanent magnets 41 illustrated in FIG. 2B and the cylindrical soft magnetic bodies 42 illustrated in FIG. 2C are arranged around the shaft 40.

As the shaft 40, a stud bolt made of a nonmagnetic material having a male screw 40a on an outer circumferential surface is employed. A female screw 42a such as a nut is formed in an inner circumferential surface of the cylindrical soft magnetic body 42. Therefore, the permanent magnet 41 is interposed between the soft magnetic bodies 42 and 42, and the soft magnetic bodies 42 are screwed to the shaft 40 so as to form the magnetic exciter 2. When the permanent magnets 41 are interposed between the soft magnetic bodies 42 and 42, and the soft magnetic bodies 42 are screwed, the permanent magnets 41 are arranged to repulsively interact with each other (N-N or S-S).

In the tubular linear motor 100 according to the present embodiment, a sensor 50 such as a linear sensor or a magnetic pole detection sensor is incorporated. As illustrated in FIG. 1, the sensor 50 is arranged, for example, in one end of the tooth 20 in an axial direction.

The linear sensor may include, for example, but not limited to, a magnetic linear sensor that outputs a voltage proportional to a variation of the magnetic flux density. The magnetic pole detection sensor may include, for example, but not limited to, a Hall element that converts a magnetic field into an electrical signal based on the Hall effect and outputs the electrical signal.

[Operations of Tubular Linear Motor]

Next, operations of the tubular linear motor 100 according to Embodiment 1 will be described with reference to FIGS. 1 to 3.

As illustrated in FIG. 1, the magnetic exciter 2 of the tubular linear motor 100 according to Embodiment 1 has a plurality of permanent magnets 41 arranged to repulsively interact with each other (N-N or S-S) along an axial direction, and the soft magnetic body 42 is interposed between the permanent magnets 41 and 41. The armature 1 is arranged to surround the magnetic exciter 2 and has a plurality of coils 30 arranged side by side along an axial direction.

According to Embodiment 1, the armature 1 serves as a mover, and the magnetic exciter 2 serves as a stator. That is, in the tubular linear motor 100 according to the present embodiment, an electric current flows through the coil 30 of the armature 1 so as to intersect the magnetic flux generated by the permanent magnet 41 of the magnetic exciter 2. If the magnetic flux of the permanent magnet 41 intersects the electric current flowing through the coil 30 of the armature 1, the tubular linear motor 100 according to the present embodiment generates a driving force in the coil 30 in an axial direction based on an electromagnetic induction effect to shift the armature 1 along the axial direction.

In the tubular linear motor 100 according to the present embodiment, the tooth diametrical length T is set to be 0.6 times or smaller of the coil diametrical length L (diametrical length L obtained by subtracting the mechanical gap Xm from the distance between the closed surface 21a of the slot 21 and the magnetic surface of the magnetic exciter 2).

Here, a reason why the tooth diametrical length T is set to T≤L×0.6 will be described with reference to FIG. 3. FIG. 3 is an explanatory diagram illustrating a relationship between the tooth diametrical length and the magnetic attractive force.

Figure 3:
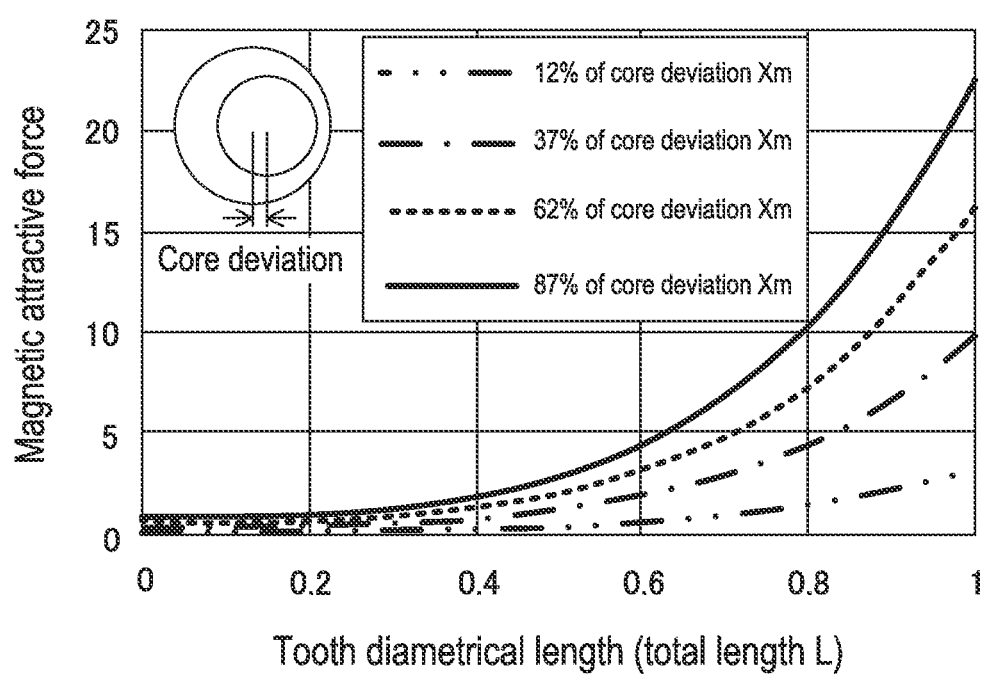
FIG. 3 is an explanatory diagram illustrating a relationship between a tooth diametrical length and a magnetic attractive force.

As illustrated in FIG. 3, in a case where a core deviation is generated between the armature 1 and the magnetic exciter 2, the magnetic attractive force tends to increase as the tooth diametrical length T approaches the coil diametrical length L. This tendency of the increasing magnetic attractive force becomes significant as the eccentricity between the armature 1 and the magnetic exciter 2 increases.

Therefore, if the tooth diametrical length T is set to be smaller than the coil diametrical length L, the magnetic gap Xg is widened, so that the magnetic attractive force exerted to the magnetic gap Xg is reduced.

The coil 30 according to the present embodiment extends over the teeth 20 from the inner side of the slot 21 toward the magnetic exciter 2 while a mechanical gap is reserved. Therefore, since the coil 30 exists in both the inner and outer sides of the slot 21, the winding number of the coil 30 increases, so that it is possible to increase the thrust force of the rectilinear motion caused by the electromagnetic induction.

The permanent magnets 41 of the magnetic exciter 2 are arranged to repulsively interact with each other (N-N or S-S) along an axial direction around the shaft 40. Since the soft magnetic body 42 is interposed between the permanent magnets 41 and 41, it is possible to employ a repulsive magnetic pole arrangement while the magnetic repulsive force is overcome.

In addition, a relationship tp=Wm+Ws is established, where tp denotes a magnetic pole pitch, Wm denotes a width of the permanent magnet, and Ws denotes a width of the soft magnetic body. Furthermore, according to the present invention, the width Wm of the permanent magnet is set to 0.8±0.1 tp. Therefore, the soft magnetic body 42 having a size of approximately 20 to 30% of the magnetic pole pitch tp is interposed between the permanent magnets 41 and 41 arranged to repulsively interact with each other, so that the consumption of the permanent magnetic material is reduced, the average magnetic flux density of the magnetic exciter 2 increases, and an effective utilization rate of the permanent magnet contributing to the thrust force increases.

The permanent magnet 41 is interposed between the soft magnetic bodies 42 and 42 having a female screw 42a on the inner circumferential surface, and the soft magnetic bodies 42 are screwed to the shaft 40, so as to form the magnetic exciter 2. Therefore, it is possible to easily manufacture the magnetic exciter 2 only by installing the permanent magnets 41 and the soft magnetic bodies 42 in the shaft 40.

That is, in the tubular linear motor 100 according to Embodiment 1, the coil 30 is arranged in both the inner and outer sides of the slot 21. Therefore, using the tubular linear motor 100 according to the present invention, it is possible to increase the thrust force of the rectilinear motion by increasing the winding number of the coil 30.

Since the coil 30 extends over the teeth 20 from the inner side of the slot 21 toward the magnetic exciter 2 while a mechanical gap Xm is reserved, the diametrical length T of the tooth 20 is smaller than the diametrical length L of the coil 30. Therefore, in the tubular linear motor 100 according to the present embodiment, the magnetic gap Xg is widened, so that it is possible to reduce the influence of the magnetic attractive force caused by the core deviation of the magnetic exciter 2.

In addition, the magnetic exciter 2 has a plurality of permanent magnets 41 arranged to repulsively interact with each other by interposing the soft magnetic bodies 42. Therefore, using the tubular linear motor 100 according to the present embodiment, it is possible to reduce consumption of the permanent magnetic material and increase an average magnetic flux density and an effective utilization rate of the permanent magnet contributing to the thrust force, so that the manufacturing cost of the tubular linear motor 100 can be reduced.

Embodiment 2

Figure 4:
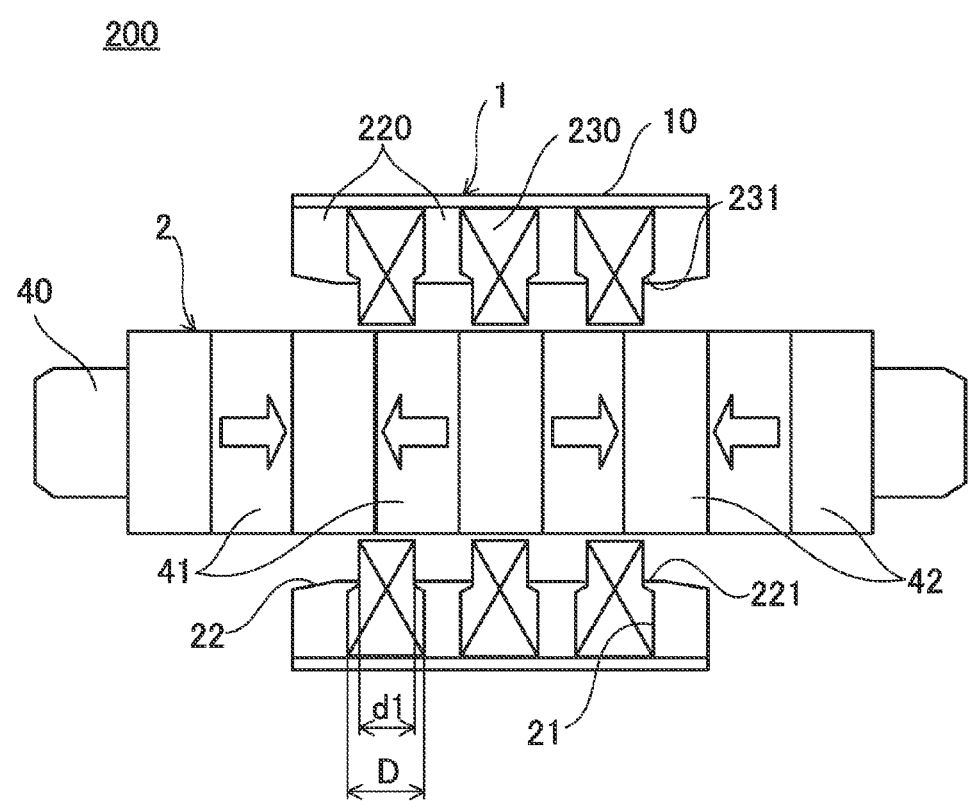
FIG. 4 is a schematic cross-sectional view illustrating a tubular linear motor according to Embodiment 2.

Next, a tubular linear motor 200 according to Embodiment 2 will be described with reference to FIG. 4. FIG. 4 is a schematic cross-sectional view illustrating the tubular linear motor according to Embodiment 2. In the following description, like reference numerals denote like elements as in the tubular linear motor 100 according to Embodiment 1, and description thereof will not be repeated.

As illustrated in FIG. 4, the tubular linear motor 200 according to Embodiment 2 has a similar configuration to that of Embodiment 1 except for shapes of the coil 230 and the teeth 220 of the armature 1.

In the coil 230 according to Embodiment 2, a width d1 of a portion of the coil extending over the tooth 220 from the opening end of the tooth 220 toward the magnetic exciter 2 is smaller than a width D of a portion of the coil stored in the slot 21. That is, the cross section of the coil 230 is stepped with a step portion 231.

The leading edge of the tooth 220 is provided with an engaging portion (protrusion) 221 protruding to the inner side of the slot 21. The protrusion 221 reliably holds the step portion 231 of the coil 230.

The tubular linear motor 220 according to Embodiment 2 basically has the same effects as those of Embodiment 1. Particularly, since the tooth 220 of the tubular linear motor 200 according to Embodiment 2 has the protrusion 221 for holding the step portion 231 of the coil 230, it is possible to increase the thrust force of the rectilinear motion and easily fix the coil 230.

Embodiment 3

Figure 5:
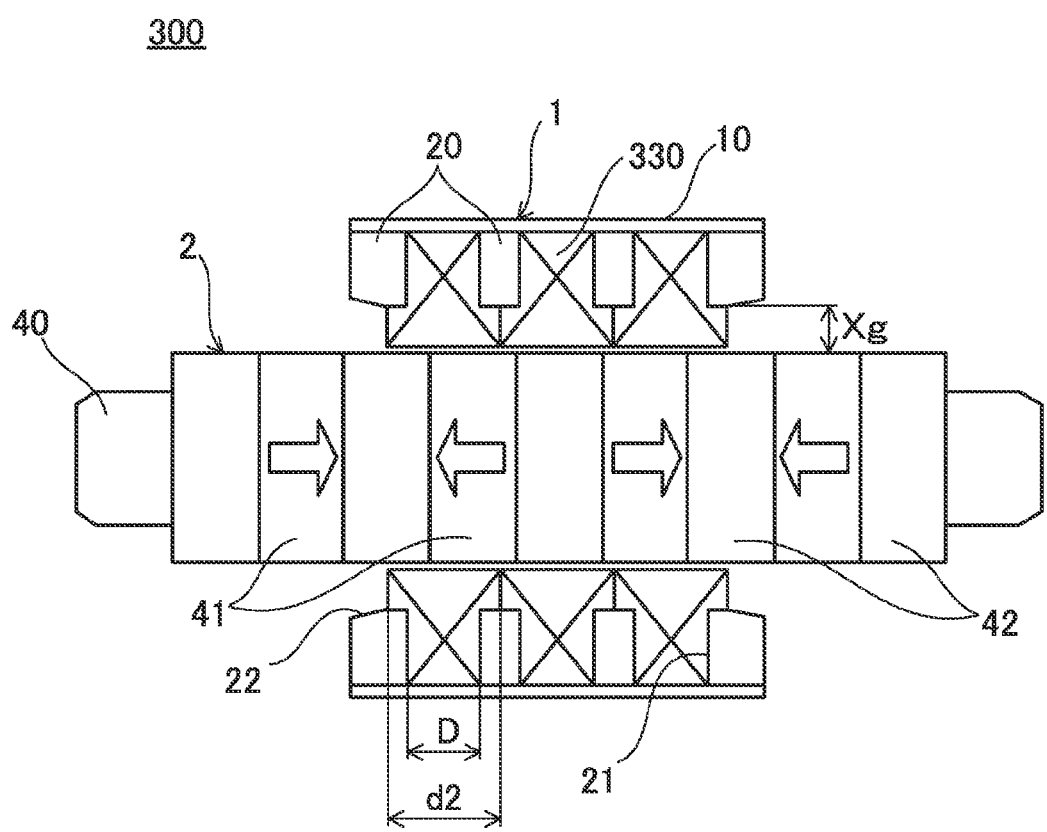
FIG. 5 is a schematic cross-sectional view illustrating a tubular linear motor according to Embodiment 3.

Next, a tubular linear motor 300 according to Embodiment 3 will be described with reference to FIGS. 5 and 6. FIG. 5 is a schematic cross-sectional view illustrating the tubular linear motor according to Embodiment 3. In the following description, like reference numerals denote like elements as in the tubular linear motor 100 according to Embodiment 1, and description thereof will not be repeated.

As illustrated in FIG. 5, the tubular linear motor 300 according to Embodiment 3 has a similar configuration to that of Embodiment 1 except for the shape of the coil 330 of the armature 1.

In the coil 330 according to Embodiment 3, a width d2 of a portion of the coil extending from the opening end of the tooth 20 toward the magnetic exciter 2 is larger than a width D of a portion of the coil stored in the slot 21. That is, the coil 330 is formed to extend from the opening end of the tooth 20 toward the magnetic exciter 2 and be widened to the magnetic gap (teeth gap) Xg side so as to cover the inner surface of the tooth 20.

Figure 6:
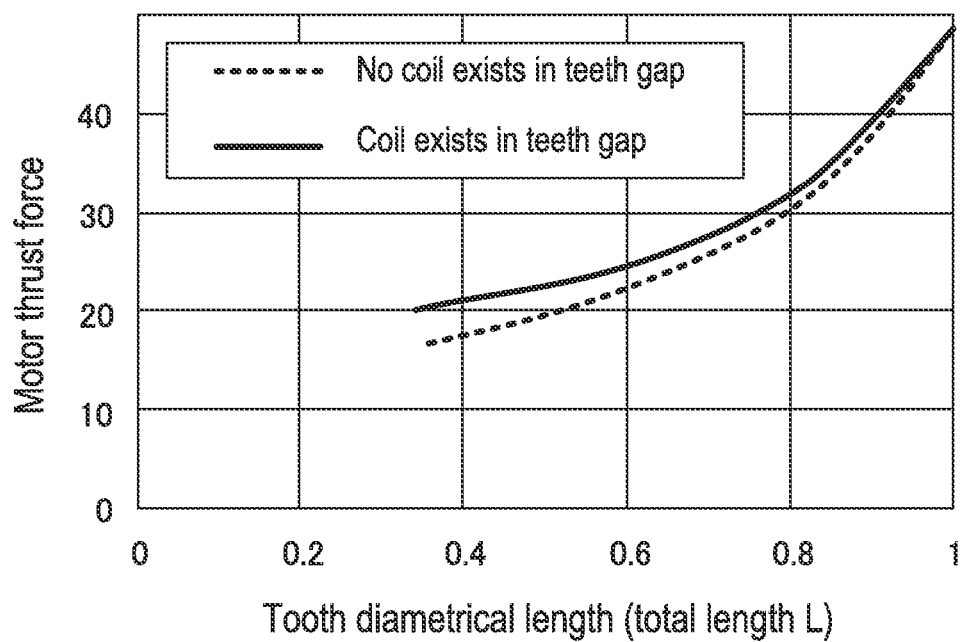
FIG. 6 is an explanatory diagram illustrating a relationship between a motor thrust force and a tooth diametrical length depending on whether or not there is a coil in the teeth gap.

FIG. 6 is an explanatory diagram illustrating a relationship between a motor thrust force and a tooth diametrical length depending on whether or not there is a coil in the teeth gap. As illustrated in FIG. 6, it is recognized that the motor thrust force increases in a case where the coil exists in the teeth gap, compared to a case where the coil does not exists in the teeth gap.

That is, since the coil 330 is provided to extend toward the magnetic exciter 2 and be widened to the magnetic gap Xg side, it is possible to increase the winding number of the coil 330 and further increase the thrust force of the rectilinear motion caused by the electromagnetic induction effect.

The tubular linear motor 300 according to Embodiment 3 basically has the same effects as those of Embodiment 1. Particularly, in the tubular linear motor 300 according to Embodiment 3, it is possible to increase the thrust force of the rectilinear motion with a low loss by effectively using the space of the magnetic gap Xg.

Embodiment 4

Figure 7:
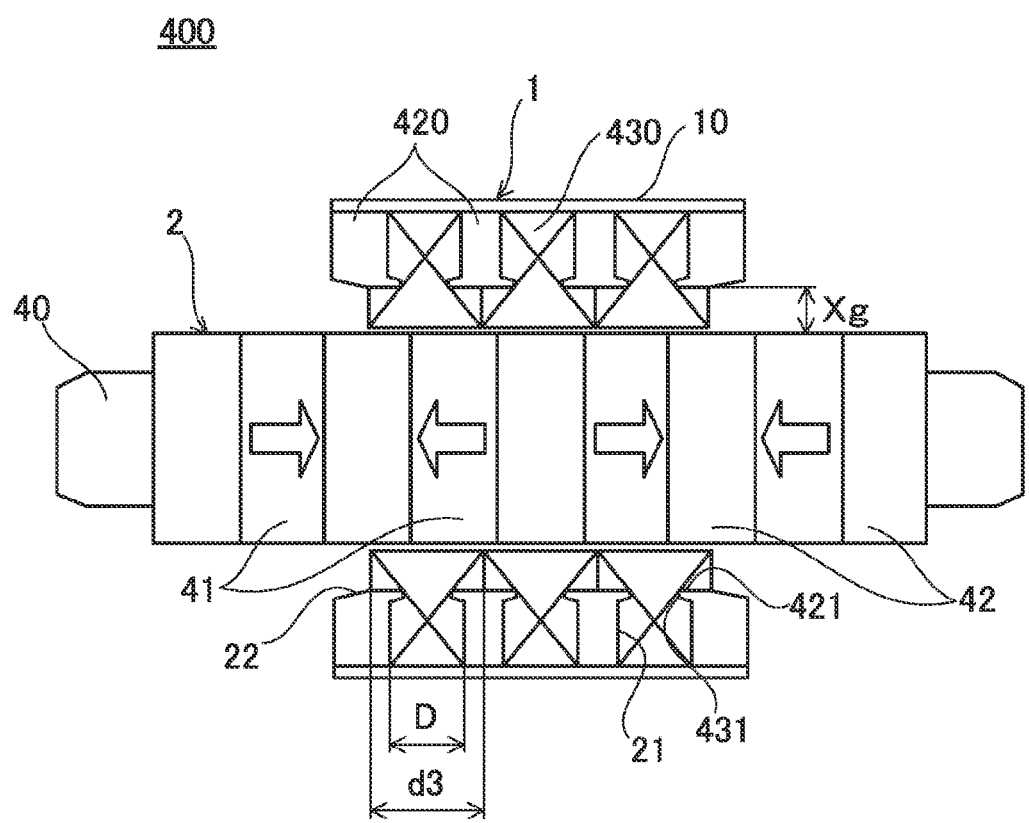
FIG. 7 is a schematic cross-sectional view illustrating a tubular linear motor according to Embodiment 4.

Next, a tubular linear motor 400 according to Embodiment 4 will be described with reference to FIG. 7. FIG. 7 is a schematic cross-sectional view illustrating the tubular linear motor according to Embodiment 4. In the following description, like reference numerals denote like elements as in the tubular linear motor 100 according to Embodiment 1, and description thereof will not be repeated.

As illustrated in FIG. 7, the tubular linear motor 400 according to Embodiment 4 has a similar configuration to that of Embodiment 1 except for the shapes of the coil 430 and the teeth 420 of the armature 1.

In the coil 430 according to Embodiment 4, a width d3 of a portion of the coil extending from the opening end of the tooth 420 toward the magnetic exciter 2 is larger than a width D of a portion of the coil stored in the slot 21. That is, the coil 430 is formed to extend from the opening end of the tooth 420 toward the magnetic exciter 2 and be widened to the magnetic gap (teeth gap) Xg side so as to cover the inner surface of the tooth 420.

The motor thrust force increases in a case where the coil exists in the teeth gap, compared to a case where the coil does not exist in the teeth gap (refer to FIG. 6). Since the coil 430 is provided to extend toward the magnetic exciter 2 and be widened to the magnetic gap Xg side, it is possible to increase the winding number of the coil 430 and the thrust force of the rectilinear motion caused by the electromagnetic induction effect.

In the step portion of the coil 430, there is a concave portion 431 inwardly notched in the width direction of the coil 430. Meanwhile, an engaging portion (protrusion) 421 protruding to the inner side of the slot 21 is formed in the leading edge of the teeth 420. The protrusion 421 reliably holds the concave portion 431 of the coil 430.

The tubular linear motor 400 according to Embodiment 4 basically has the same effects as those of Embodiment 1. Particularly, similar to Embodiment 3, using the tubular linear motor 400 according to Embodiment 4, it is possible to increase the thrust force of the rectilinear motion with a low loss by effectively using the space of the magnetic gap Xg.

In addition, in the tubular linear motor 400 according to Embodiment 4, since the protrusion 421 for holding the concave portion 431 of the coil 430 is provided in the tooth 420, it is possible to increase the thrust force of the rectilinear motion and easily fix the coil 430.

That is, the tubular linear motor 400 according to Embodiment 4 has the same advantages as those of both the Embodiments 2 and 3.

Embodiment 5

Figure 8:
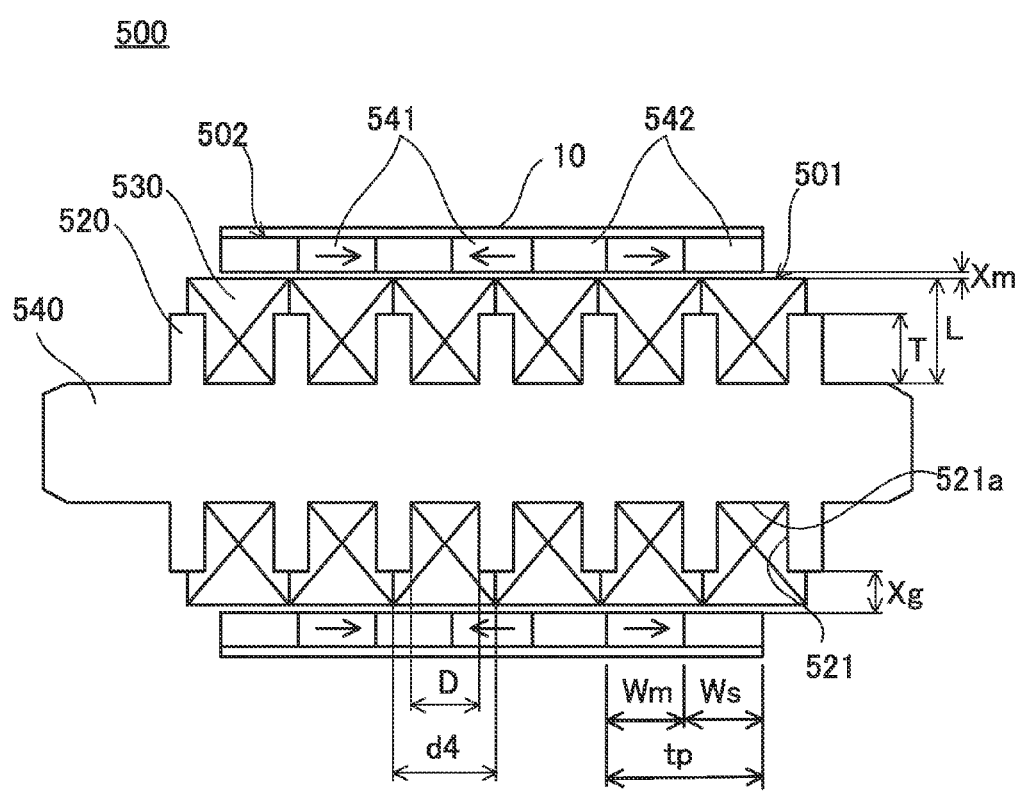
FIG. 8 schematic cross-sectional view illustrating a tubular linear motor according to Embodiment 5.

Next, a tubular linear motor 500 according to Embodiment 5 will be described with reference to FIG. 8. FIG. 8 is a schematic cross-sectional view illustrating the tubular linear motor according to Embodiment 5. In the following description, like reference numerals denote like elements as in the tubular linear motor 100 according to Embodiment 1, and description thereof will not be repeated.

As illustrated in FIG. 8, the tubular linear motor 500 according to Embodiment 5 is different from those of Embodiments 1 to 4 in that a magnetic exciter 502 is provided in the yoke 10, and an armature 501 is provided in a shaft 540.

The magnetic exciter 502 is provided to face the coil 530 of the armature 501. The armature 501 according to the present embodiment is provided in the cylindrical magnetic exciter 502 along an axial direction.

The magnetic exciter 502 is provided in the inner circumferential surface of the cylindrical yoke 10. The yoke 10 according to the present embodiment is necessarily made of a nonmagnetic material. According to Embodiment 5, the magnetic exciter 502 serves as a mover.

The magnetic exciter 502 has a plurality of ring-like permanent magnets 541 magnetized to repulsively interact with each other (N-N or S-S) along an axial direction. A ring-like soft magnetic body 542 is interposed between the permanent magnets 541 and 541 arranged to repulsively interact with each other.

It is preferable that a relationship tp=Wm+Ws be established, where tp denotes a magnetic pole pitch of the magnetic exciter 502, Wm denotes a width of the permanent magnet 541, and Ws denotes a width of the soft magnetic body 542, and the width of the permanent magnet 541 be set to Wm=0.8±0.1 tp. If the soft magnetic body 542 having a size of, approximately, a half of the magnetic pole pitch tp is interposed between the permanent magnets 541 and 541 arranged to repulsively interact with each other, it is possible to reduce the consumption of the permanent magnetic material and increase the average magnetic flux density of the magnetic exciter 502.

The armature 501 has a shaft 540, teeth 520, and a coil 530. According to Embodiment 5, the armature 501 serves as a stator.

The teeth 520 according to the present embodiment are formed in a generally ring-like shape along the outer circumferential surface of the shaft 540. A plurality of teeth 520 are arranged side by side along an axial direction in the outer circumference surface of the shaft 540.

Between the teeth 520 and 520, a plurality of slots 521 having a ring concave shape are formed side by side along an axial direction. The diametrical inner side of each slot 521 is closed by the shaft 540, and the diametrical outer side is opened. The number of slots 521 corresponds to the number of coils 530. According to the present embodiment, six slots 521 are formed, and six coils 530 are stored side by side along an axial direction. However, the number of slots 521 and the number of coils 530 are not limited.

The diametrical length T of the tooth 520 is set to be smaller than the diametrical length L of the coil 530. Specifically, the tooth diametrical length T is set to 0.6 times or smaller of the coil diametrical length L (diametrical length L obtained by subtracting the mechanical gap Xm from the distance between the closed surface 521a of the slot 21 and the magnetic exciter 502).

Since the tooth 520 is a magnetic body, a gap between the tooth surface and the magnetic surface of the magnetic exciter 520 becomes the magnetic gap Xg.

The coil 530 is wound in a cylindrical shape along the outer circumferential surface of the shaft 540. The coil 530 is formed such that a width d4 of a portion of the coil extending from the opening end of the tooth 520 toward the magnetic exciter 502 is larger than a width D of a portion of the coil stored in the slot 21. That is, the coil 530 is formed to extend from the opening end of the tooth 520 toward the magnetic exciter 502 and be widened to the magnetic gap (teeth gap) Xg side to cover the outer surface of the tooth 520.

In a case where the coil exists in the teeth gap, the motor thrust force increases, compared to a case where the coil does not exist in the teeth gap (refer to FIG. 6).

That is, since the coil 530 is provided to extend toward the magnetic exciter 502 and be widened to the magnetic gap Xg side, it is possible to increase the winding number of the coil 530 and the thrust force of the rectilinear motion caused by the electromagnetic induction effect.

As described above, according to the present embodiment, although six coils 530 are provided side by side along an axial direction, the number of coils 530 is not limited.

The tubular linear motor 500 according to Embodiment 5 basically has the same effects as those of Embodiment 1. Particularly, in the tubular linear motor 500 according to Embodiment 5, the armature 501 provided in the shaft 540 serves as a stator, and the magnetic exciter 502 provided in the yoke 10 serves as a mover.

Similar to Embodiments 3 and 4, in the tubular linear motor 500 according to Embodiment 5, it is possible to increase the thrust force of the rectilinear motion with a low loss by effectively using the space of the magnetic gap Xg.

Embodiment 6

Next, a magnetic exciter 602 of a tubular linear motor according to Embodiment 6 will be described with reference to FIGS. 9A to 9C. FIGS. 9A to 9C are schematic cross-sectional views illustrating the magnetic exciter of the tubular linear motor according to Embodiment 6. In the following description, like reference numerals denote like elements as in the magnetic exciter 2 of the tubular linear motor 100 according to Embodiment 1, and description thereof will not be repeated.

As illustrated in FIGS. 9A to 9C, the magnetic exciter 602 of the tubular linear motor according to Embodiment 6 has a similar configuration to that of Embodiment 1 except for the shapes of the permanent magnet 641 and the soft magnetic body 642.

According to Embodiment 6, a permanent magnet 641 having a step portion 641a in an outer diameter and a soft magnetic body 642 having a step portion 642a in an inner diameter are alternately combined to form the magnetic exciter 602.

Similar to Embodiment 1, a stud bolt made of a nonmagnetic material having a male screw 40a formed on an outer circumferential surface is employed as the shaft 40. A female screw 642b such as a nut is formed on an inner circumferential surface of the cylindrical soft magnetic body 642. Therefore, the magnetic exciter 602 is formed by interposing the permanent magnet 641 between the soft magnetic bodies 642 and 642 and screwing the soft magnetic bodies 642 into the shaft 40. The permanent magnets 641 are arranged to repulsively interact with each other (N-N or S-S) along an axial direction when they are interposed between the soft magnetic bodies 642 and 642, and the soft magnetic bodies 642 are screwed.

On the contrary, a reverse configuration may be possible such that the permanent magnet 641 has a step portion in an inner diameter, and the soft magnetic body 642 has a step portion in an outer diameter. The permanent magnets 641 and the soft magnetic bodies 642 may be engaged with each other.

The tubular linear motor having the magnetic exciter 602 according to Embodiment 6 basically has the same effects as those of Embodiment 1. Particularly, in the magnetic exciter 602 according to Embodiment 6, since the permanent magnets 641 having the step portion 641a in an outer diameter and the soft magnetic bodies 642 having a step portion 642a in an inner diameter are combined, it is possible to reliably position the permanent magnets 641 and the soft magnetic bodies 642.

Embodiment 7

Next, a magnetic exciter 702 of a tubular linear motor according to Embodiment 7 will be described with reference to FIGS. 10A to 10C. FIGS. 10A to 10C are schematic cross-sectional views illustrating the magnetic exciter of the tubular linear motor according to Embodiment 7.

As illustrated in FIGS. 10A to 10C, the magnetic exciter 702 of the tubular linear motor according to Embodiment 7 is different from that of Embodiment 1 in that end caps 743 and 743 are provided in both ends of the shaft 740.

The end caps 743 are literally a cylindrical cap-like member whose one end is closed. Inside the end caps 743, there are formed female screws 743a screwed into male screws 740a in both ends of the shaft 740. Unlike the shaft 740 made of a nonmagnetic material, a material of the end cap 743 is not particularly limited to a magnetic material or a nonmagnetic material. Particularly, in the case of the magnetic material, the soft magnetic bodies 742 in both ends of the magnetic exciter may be omitted as described below.

According to Embodiment 7, since the end caps 743 and 743 are provided in both ends of the shaft 740, both the permanent magnet 741 and the soft magnetic body 742 are formed in a ring-like shape. No female screw is formed in the inner circumferential surfaces of the permanent magnet 741 and the soft magnetic body 742.

Therefore, a male screw 740a may be formed on the outer circumferential surfaces in both ends of the shaft 740. It is not necessary to provide a male screw in a portion of the outer circumferential surface of the shaft 740 corresponding to the permanent magnet 741 and the soft magnetic body 742.

That is, by installing the end caps 743 and 743 in both ends of the shaft 740, the permanent magnet 741 and the soft magnetic body 742 are robustly interposed between the end caps 743 and 743.

The permanent magnets 741 are arranged to repulsively interact with each other (N-N or S-S) by interposing the soft magnetic body 742.

The end cap 743 may be provided in at least one end of the shaft 740. The cylindrical linear motor having the magnetic exciter 702 according to Embodiment 7 basically has the same effects as those of Embodiment 1. Particularly, the end cap 743 made of a magnetic material as the magnetic exciter 702 according to Embodiment 7 may also serve as the soft magnetic body 742. Therefore, the magnetic exciter can be configured only by installing the end caps 743 in both ends of the shaft.

In the magnetic exciter 702 according to Embodiment 7, the end cap 743 may be installed as necessary. Therefore, it is possible to provide excellent versatility depending on customer's demands.

Embodiment 8

Next, a magnetic exciter 802 of a tubular linear motor according to Embodiment 8 will be described with reference to FIGS. 11A and 11B. FIGS. 11A and 11B are schematic cross-sectional views illustrating the magnetic exciter of the tubular linear motor according to Embodiment 8.

As illustrated in FIGS. 11A and 11B, the magnetic exciter 802 of the tubular linear motor according to Embodiment 8 is different from that of Embodiment 1 in that linear guides 843 and 843 are provided in both ends of the shaft 840 made of a nonmagnetic material.

According to the present embodiment, for example, a guide shaft having a guide trench 844 along an axial direction is employed as the linear guide 843. The guide shaft 843 is a round bar-like nonmagnetic body having a mount concave portion whose one end is opened. In the inner circumferential surface of the mount concave portion of the guide shaft 843, there are female screws 843a screwed into the male screws 840a in both ends of the shaft 840. In both side faces of the outer circumference of the guide shaft 843, guide trenches 844 having a semicircular cross-sectional shape are formed.

The guide shaft 843 is installed in both ends of the shaft 840 by interposing a ring-like cylindrical cap 845. In the inner circumferential surface of the cylindrical cap 845, there are female screws 845a screwed into the male screws 840a in both ends of the shaft 840.

According to Embodiment 8, the guide shafts 843 and 843 are provided in both ends of the shaft 840 by interposing the cylindrical caps 845 and 845. Therefore, similar to Embodiment 7, both the permanent magnet 841 and the soft magnetic body 842 are formed in a ring-like shape. Therefore, in the outer circumferential surface in both ends of the shaft 840, there may be male screws 840a screwed into the female screw 845a of the cylindrical cap 845 and screwed into the female screw 843a of the guide shaft 843. The male screw is not necessary in a portion of the outer circumferential surface corresponding to the permanent magnet 841 and the soft magnetic body 842.

That is, by doubly installing the cylindrical caps 845 and 845 and the guide shafts 843 and 843 in both ends of the shaft 840, the permanent magnet 841 and the soft magnetic body 842 are robustly interposed between the cylindrical caps 845 and 845 and the guide shafts 843 and 843.

The cylindrical caps 845 and 845 may also serve as the soft magnetic body 842. After the cylindrical caps 845 and 845 are installed in both ends of the shaft 840, the guide shafts 843 and 843 are installed in both ends of the shaft 840 as necessary.

The permanent magnets 841 are arranged to repulsively interact with each other (N-N or S-S) by interposing the soft magnetic body 842.

As the linear guide 843, for example, a ball spline having a ball sliding mechanism moving along an axial direction may be employed instead of the guide shaft 843, but the invention is not limited thereto. In addition, the linear guide 843 may be provided in at least one end of the shaft 840.

The cylindrical linear motor having the magnetic exciter 802 according to Embodiment 8 basically has the same effects as those of Embodiment 1. Particularly, in the magnetic exciter 802 according to Embodiment 8, the permanent magnet 841 and the soft magnetic body 842 are fixed and interposed between the cylindrical caps 845 and 845. Therefore, the permanent magnet 841 and the soft magnetic body 842 can be formed in a simple integrated structure.

In the magnetic exciter 802 according to Embodiment 8, the linear guide 843 can be installed as necessary. Therefore, it is possible to provide excellent versatility depending on customer's demands.

While preferable embodiments of the invention have been described hereinbefore, they are just for illustrative purposes and are not intended to limit the scope of the invention. Instead, various changes, alterations, and modifications may be possible within the scope and spirit of the invention.

What is claimed is:

1. A tubular linear motor comprising:
an armature having a coil; and
a magnetic exciter that is provided to face the coil and has a plurality of permanent magnets,
wherein the armature has a yoke that closes magnetic field lines, teeth that partition to define a slot for storing the coil, and the coil that is arranged to extend over the teeth from an inside of the slot toward the magnetic exciter while a mechanical gap is reserved between the magnetic exciter and the coil, and
the magnetic exciter has a soft magnetic body interposed between adjacent ones of the plurality of permanent magnets,
wherein a width of the coil is greater between an end of the teeth and the magnetic exciter compared to a portion of the coil surrounded by the teeth.

2. The tubular linear motor according to claim 1, wherein an engaging portion protruding to the inner side of the slot for storing the coil is formed in a end of the tooth.

3. The tubular linear motor according to claim 1, wherein a diametrical length of the tooth is 0.6 times or smaller of a diametrical length obtained by subtracting the mechanical gap from a distance between a closed surface of the slot and a magnetic surface of the magnetic exciter.

4. The tubular linear motor according to claim 1, wherein, in the magnetic exciter, a soft magnetic body is interposed between magnets magnetized to repulsively interact with each other along an axial direction.

5. The tubular linear motor according to claim 4, wherein a relationship tp=Wm+Ws is established, where tp denotes a magnetic pole pitch of the magnetic exciter, Wm denotes a width of the permanent magnet, and Ws denotes a width of the soft magnetic body, and the width Wm of the permanent magnet is set to 0.8±0.1 tp.

6. The tubular linear motor according to claim 4, wherein, in the magnetic exciter, the permanent magnet and the soft magnetic body having a female screw in an inner circumferential surface are alternately arranged around a shaft made of a nonmagnetic material.

7. The tubular linear motor according to claim 4, wherein, in the magnetic exciter, the permanent magnet and the soft magnetic body having a female screw in an inner circumferential surface are alternately arranged around a shaft made of a nonmagnetic material such that the permanent magnet and the soft magnetic body are engaged in a step portion.

8. The tubular linear motor according to claim 6, wherein an end cap is provided in at least one end of the shaft.

9. The tubular linear motor according to claim 6, wherein a linear guide is provided in at least one end of the shaft.

10. The tubular linear motor according to claim 1, wherein a linear sensor is incorporated.

11. The tubular linear motor according to claim 1, wherein a magnetic pole detection sensor is incorporated.

12. The tubular linear motor according to claim 1, wherein the magnetic exciter serves as a stator, and the armature having the coil serves as a mover.

13. The tubular linear motor according to claim 1, wherein the armature having the coil serves as a stator, and the magnetic exciter serves as a mover.

14. A tubular linear motor comprising:
an armature having a coil; and
a magnetic exciter that is provided to face the coil and has a plurality of permanent magnets,
wherein the armature has a yoke that closes magnetic field lines, teeth that partition to define a slot for storing the coil, and the coil that is arranged to extend over the teeth from an inside of the slot toward the magnetic exciter while a mechanical gap is reserved between the magnetic exciter and the coil, and
the magnetic exciter has a soft magnetic body interposed between adjacent ones of the plurality of permanent magnets,
wherein a diametrical length of the tooth is 0.6 times or smaller of a diametrical length obtained by subtracting the mechanical gap from a distance between a closed surface of the slot and a magnetic surface of the magnetic exciter.

* * * * *